(12) United States Patent
Guntermann et al.

(10) Patent No.: US 8,936,735 B2
(45) Date of Patent: Jan. 20, 2015

(54) POLYMER COATINGS WITH IMPROVED HEAT STABILITY

(75) Inventors: Udo Guntermann, Krefeld (DE); Friedrich Jonas, Aachen (DE)

(73) Assignee: Heraeus Precious Metals GmbH & Co. KG (DE)

( * ) Notice: Subject to any disclaimer, the term of this patent is extended or adjusted under 35 U.S.C. 154(b) by 793 days.

(21) Appl. No.: 13/256,329

(22) PCT Filed: Mar. 4, 2010

(86) PCT No.: PCT/EP2010/001351
§ 371 (c)(1),
(2), (4) Date: Dec. 19, 2011

(87) PCT Pub. No.: WO2010/102751
PCT Pub. Date: Sep. 16, 2010

(65) Prior Publication Data
US 2012/0097897 A1 Apr. 26, 2012

Related U.S. Application Data

(60) Provisional application No. 61/267,536, filed on Dec. 8, 2009.

(30) Foreign Application Priority Data

Mar. 13, 2009 (DE) .......... 10 2009 012 660

(51) Int. Cl.
| | | |
|---|---|---|
| H01B 1/00 | (2006.01) | |
| H01B 1/12 | (2006.01) | |
| H01B 1/20 | (2006.01) | |
| C08K 5/134 | (2006.01) | |
| B05D 5/12 | (2006.01) | |
| C09D 5/24 | (2006.01) | |
| C09D 145/00 | (2006.01) | |
| C09D 165/00 | (2006.01) | |
| C08K 5/1545 | (2006.01) | |

(52) U.S. Cl.
CPC ............... C09D 5/24 (2013.01); C08K 5/1545 (2013.01); H01B 1/127 (2013.01)
USPC ........... 252/500; 528/210; 528/378; 528/423; 427/58

(58) Field of Classification Search
USPC .............. 252/500; 528/210, 378, 423; 427/58
See application file for complete search history.

(56) References Cited

U.S. PATENT DOCUMENTS

| | | |
|---|---|---|
| 5,300,575 A | 4/1994 | Jonas et al. |
| 6,083,635 A | 7/2000 | Jonas et al. |
| 6,376,105 B1 | 4/2002 | Jonas et al. |
| 2008/0290324 A1* | 11/2008 | Louwet et al. ................ 252/500 |
| 2010/0252782 A1 | 10/2010 | Masahiro |

FOREIGN PATENT DOCUMENTS

| | | |
|---|---|---|
| CN | 101035860 A | 9/2007 |
| CN | 101379138 A | 3/2009 |
| DE | 19627071 A1 | 1/1998 |
| EP | 440957 A2 | 8/1991 |
| EP | 1798259 A1 | 6/2007 |
| JP | 2009-102601 | 5/2009 |
| WO | WO-2008/055834 A1 | 5/2008 |

* cited by examiner

*Primary Examiner* — Brian P Mruk
(74) *Attorney, Agent, or Firm* — Drinker Biddle & Reath LLP

(57) ABSTRACT

The present invention relates to coatings comprising electrically conductive polymers and esters of gallic acid and sugars, their production and use, and dispersions for the production of such coatings.

16 Claims, No Drawings

POLYMER COATINGS WITH IMPROVED HEAT STABILITY

CROSS-REFERENCE TO RELATED APPLICATIONS

This application is a national stage application, under 35 U.S.C. §371, of PCT/EP2010/001351, filed Mar. 4, 2010, which claims priority of provisional U.S. Application No. 61/267,536, filed Dec. 8, 2009, and German Patent Application No. 10 2009 012 330.0, filed Mar. 13, 2009.

BACKGROUND OF THE INVENTION

Electrically conductive polymers from the class of polypyrroles, polyanilines and polythiophenes are known from the literature. Poly(3,4-alkylenedioxythiophene) dispersions in particular have recently acquired technical importance, since they can be used, for example, for the production of conductive or antistatic coatings (see e.g. EP-A 440 957). In practice, however, it has been found that the electrical conductivity of the coatings from such dispersions is not always sufficiently stable for practical uses under a higher temperature and/or UV irradiation.

EP 1798259 A1 and WO 2008/055834 A1 disclose that e.g. the heat stability or UV stability of the electrical conductivity of coatings comprising polythiophene dispersions can be increased if derivatives of gallic acid (3,4,5-trihydroxybenzoic acid), such as, for example, gallic acid propyl ester, are added. Nevertheless, this stabilizing action, in particular the action on the heat stability, is not sufficient for many long-term uses.

There thus continued to be a need for conductive or antistatic coatings with improved heat or UV stability compared with the known coatings and for suitable dispersions for the production of such coatings.

BRIEF SUMMARY OF THE INVENTION

The present invention relates to coatings comprising electrically conductive polymers and esters of gallic acid and sugars, their production and use, and dispersions for the production of such coatings.

The object of the present invention was therefore to provide such coatings with improved heat or UV stability and suitable dispersions for the production thereof.

It has now been found, surprisingly, that dispersions comprising at least one conductive polymer and at least one ester of gallic acid and sugars, called gallic acid ester in the following, are suitable for the production of coatings which have, for example, significantly better heat stabilities.

The present invention therefore provides a dispersion comprising at least one electrically conductive polymer, at least one counter-ion and at least one dispersing agent, characterized in that it comprises at least one ester of gallic acid and sugars.

DETAILED DESCRIPTION OF THE INVENTION

In the context of the invention, gallic acid esters are understood as meaning esters which are summarized in the literature by the name tannins or tannin substances of gallic acid (see e.g. http://www.roempp.com/prod/index1.html under the key word tannins or http://www.biologie.uni-hamburg.de/b-online/d26/11.htm).

The following formula of β-1,2,3,4,5-pentagalloyl-O-D-glucose represents an example of a gallic acid ester:

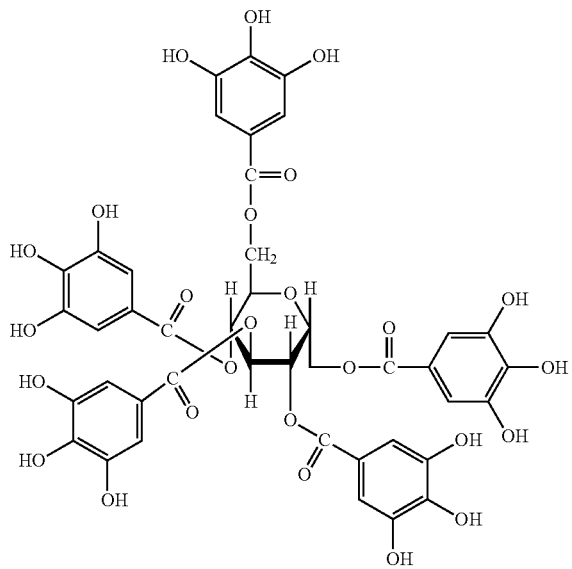

© Peter v. Sengbusch wherein the galloyl radical shown in the above formula can also be replaced, for example, by a digalloyl radical. The gallic acid esters can be employed as the pure substance or as a mixture of various gallic acid esters. Gallic acid esters which can be used for such dispersions are commercially obtainable.

The gallic acid esters can be added to the dispersions according to the invention in an amount of from 1 to 100 percent by weight (wt. %), preferably from 5 to 50 wt. %, particularly preferably from 10 to 40 wt. %, based on the solids content of electrically conductive polymer, such as, for example, the polythiophene of the general formula (I), in the dispersion.

In the context of the invention, electrically conductive polymers are understood as meaning in particular the compound class of π-conjugated polymers which have an electrical conductivity after oxidation or reduction. Preferably, conductive polymers are understood as meaning those π-conjugated polymers which, after oxidation, have a specific conductivity in the dried state of the order of at least 0.01 S cm$^{-1}$.

Preferred dispersions are those wherein at least one electrically conductive polymer is an optionally substituted polythiophene, an optionally substituted polyaniline or an optionally substituted polypyrrole.

The conductive polymer or the conductive polymers is or are particularly preferably chosen from polyalkylenedioxythiophenes comprising repeating units of the general formula (I)

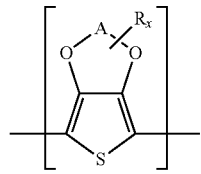

(I)

wherein
A represents an optionally substituted $C_1$-$C_5$-alkylene radical, preferably an optionally substituted $C_2$-$C_3$-alkylene radical, R independently of each other represents H, a linear or branched, optionally substituted $C_1$-$C_{18}$-alkyl radical, an optionally substituted $C_5$-$C_{12}$-cycloalkyl radical, an optionally substituted $C_6$-$C_{14}$-aryl radical, an optionally substituted $C_7$-$C_{18}$-aralkyl radical, an optionally substituted $C_1$-$C_4$-hydroxyalkyl radical or a hydroxyl radical, preferably a linear or branched, optionally substituted $C_1$-$C_4$-alkyl radical, an optionally substituted $C_1$-$C_4$-hydroxyalkyl radical or a hydroxyl radical, particularly preferably a linear or branched optionally substituted $C_1$-$C_4$-alkyl radical or a hydroxyl radical, x represents an integer from 0 to 8, preferably an integer from 0 to 2, particularly preferably 0 or 1 and in the case where several radicals R are bonded to A, these can be identical or different.

The general formula (I) is to be understood as meaning that x substituents R can be bonded to the alkylene radical A.

Polythiophenes with repeating units of the general formula (I) wherein A represents an optionally substituted $C_2$-$C_3$-alkylene radical and x represents 0 or 1 are particularly preferred.

Very particularly preferably, at least one electrically conductive polymer is poly(3,4-ethylenedioxythiophene), which is optionally substituted.

In the context of the invention, the prefix poly- is to be understood as meaning that the polymer or polythiophene comprises more than one identical or different repeating unit. The polythiophenes comprise n repeating units of the general formula (I) in total, wherein n is an integer from 2 to 2,000, preferably 2 to 100. The repeating units of the general formula (I) can in each case be identical or different within one polythiophene. Polythiophenes with in each case identical repeating units of the general formula (I) are preferred.

The polythiophenes preferably carry H on each of the end groups.

In preferred embodiments of the present invention, the dispersions comprise at least one polyalkylenedioxythiophene comprising repeating units of the general formula (I) which have a specific conductivity in the dried state of the order of at least 0.05 S cm$^{-1}$, preferably of at least 0.5 S cm$^{-1}$.

The solids content of electrically conductive polymer, in particular of a polyalkylenedioxythiophene comprising repeating units of the general formula (I), in the dispersion is between 0.05 and 3.0 wt. %, preferably between 0.1 and 1.5 wt. %, particularly preferably between 0.3 and 1.0 wt. %.

In the context of the invention, $C_1$-$C_5$-alkylene radicals A are preferably methylene, ethylene, n-propylene, n-butylene or n-pentylene. $C_1$-$C_{18}$-alkyl R preferably represent linear or branched $C_1$-$C_{18}$-alkyl radicals, such as methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl or n-octadecyl; $C_1$-$C_4$-alkyl preferably represents linear or branched $C_1$-$C_4$-alkyl radicals, such as methyl, ethyl, n- or iso-propyl, n-, iso-, sec- or tert-butyl, $C_1$-$C_8$-alkyl moreover represents, for example, n-pentyl, methylbutyl, 2-methylbutyl, 3-methylbutyl, neo-pentyl, 1-ethylpropyl, cyclohexyl, cyclopentyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl or 1-ethyl-2-methylpropyl; in the context of the invention $C_1$-$C_4$-hydroxyalkyl R preferably represents a straight-chain, cyclic, branched or unbranched $C_1$-$C_4$-alkyl radical, which is substituted by one or more, but preferably one hydroxyl group; $C_5$-$C_{12}$-cycloalkyl radicals R represent, for example, cyclopentyl, cyclohexyl, cycloheptyl, cyclooctyl, cyclononyl or cyclodecyl; $C_6$-$C_{14}$-aryl radicals R represent, for example, phenyl or naphthyl, and $C_7$-$C_{18}$-aralkyl radicals R represent, for example, benzyl, o-, m-, p-tolyl, 2,3-, 2,4-, 2,5-, 2,6-, 3,4-, 3,5-xylyl or mesityl. The preceding lists serve to illustrate the invention by way of example and are not to be considered conclusive.

In the context of the invention, numerous organic groups are possible optional further substituents of the radicals A and/or of the radicals R, for example alkyl, cycloalkyl, aryl, aralkyl, alkoxy, halogen, ether, thioether, disulphide, sulphoxide, sulphone, sulphonate, amino, aldehyde, keto, carboxylic acid ester, carboxylic acid, carbonate, carboxylate, cyano, alkylsilane and alkoxysilane groups and carboxamide groups.

Possible substituents for polyaniline or polypyrrole are, for example, the radicals A and R listed above and/or the further substituents of the radicals A and R. Unsubstituted polyanilines and polypyrroles are preferably used.

The context of the invention includes all the radical definitions, parameters and explanations above and given in the following, which are general or mentioned in preferred ranges, with one another, that is to say also in any desired combination between the particular ranges and preferred ranges.

The polythiophenes employed as conductive polymers in the dispersions can be neutral or cationic. In preferred embodiments they are cationic, "cationic" relating only to the charges on the polythiophene main chain. The polythiophenes can carry positive and negative charges in the structural unit, depending on the substituent on the radicals R, the positive charges being on the polythiophene main chain and the negative charges optionally being on the radicals R substituted by sulphonate or carboxylate groups. In this context, the positive charges of the polythiophene main chain can be partly or completely satisfied by the anionic groups optionally present on the radicals R. Overall, in these cases the polythiophenes can be cationic, neutral or even anionic. Nevertheless, in the context of the invention they are all regarded as cationic polythiophenes, since the positive charges on the polythiophene main chain are decisive. The positive charges are not shown in the formulae, since their precise number and position cannot be determined absolutely. However, the number of positive charges is at least 1 and at most n, wherein n is the total number of all repeating units (identical or different) within the polythiophene.

To compensate the positive charge, if this is not already done by the optionally sulphonate- or carboxylate-substituted and therefore negatively charged radicals R, the cationic polythiophenes require anions as counter-ions.

Counter-ions can be monomeric or polymeric anions, the latter also being called polyanions in the following.

Polymeric anions are preferable to monomeric anions, since they contribute towards film formation and because of their size lead to electrically conductive films which are more stable to heat. However, in addition to the polymeric anions, the dispersions can also comprise monomeric anions.

Polymeric anions here can be, for example, anions of polymeric carboxylic acids, such as polyacrylic acids, polymethacrylic acid or polymaleic acids, or polymeric sulphonic acids, such as polystyrenesulphonic acids and polyvinylsulphonic acids. These polycarboxylic and -sulphonic acids can also be copolymers of vinylcarboxylic and vinylsulphonic acids with other polymerizable monomers, such as acrylic acid esters and styrene.

Preferably, the dispersions according to the invention comprise at least one anion of a polymeric carboxylic or sulphonic acid as a counter-ion.

The anion of polystyrenesulphonic acid (PSS) is particularly preferred as the polymeric anion.

The molecular weight of the polyacids which supply the polyanions is preferably 1,000 to 2,000,000, particularly preferably 2,000 to 500,000. The polyacids or their alkali metal salts are commercially obtainable, e.g. polystyrenesulphonic acids and polyacrylic acids, or can be prepared by known processes (see e.g. Houben Weyl, Methoden der organischen Chemie, vol. E 20 Makromolekulare Stoffe, part 2, (1987), p. 1141 et seq.).

The dispersion can comprise polymeric anion(s) and electrically conductive polymers in particular in a weight ratio of from 0.5:1 to 50:1, preferably from 1:1 to 30:1, particularly preferably 2:1 to 20:1. The weight of the electrically conductive polymers here corresponds to the weight of the monomers employed, assuming that complete conversion takes place during the polymerization.

Monomeric anions which are used are, for example, those of $C_1$-$C_{20}$-alkanesulphonic acids, such as methane-, ethane-, propane-, butanesulphonic acid or higher sulphonic acids, such as dodecanesulphonic acid, of aliphatic $C_1$-$C_{20}$-perfluorosulphonic acids, such as trifluoromethanesulphonic acid, perfluorobutanesulphonic acid or perfluorooctanesulphonic acid, of aliphatic $C_1$-$C_{20}$-carboxylic acids, such as 2-ethylhexylcarboxylic acid, of aliphatic $C_1$-$C_{20}$-perfluorocarboxylic acids, such as trifluoroacetic acid or perfluorooctanoic acid, and of aromatic sulphonic acids optionally substituted by $C_1$-$C_{20}$-alkyl groups, such as benzenesulphonic acid, o-toluenesulphonic acid, p-toluenesulphonic acid or dodecylbenzenesulphonic acid, and of cycloalkanesulphonic acids, such as camphorsulphonic acid, or tetrafluoroborates, hexafluorophosphates, perchlorates, hexafluoroantimonates, hexafluoroarsenates or hexachloroantimonates.

The anions of p-toluenesulphonic acid, methanesulphonic acid or camphorsulphonic acid are preferred as the monomeric anions.

Cationic polythiophenes which comprise anions as counter-ions for charge compensation are also often called polythiophene/(poly)anion complexes in the technical field.

The total content of the electrically conductive polymer and counter-ion, for example in the form of such polymer/counter-ion complexes, in the dispersion according to the invention is, for example, between 0.05 and 10 wt. %, preferably between 0.1 and 2 wt. %, based on the total weight of the dispersion.

The dispersions according to the invention can comprise one or more dispersing agents. Dispersing agents which may be mentioned are, for example, the following solvents: aliphatic alcohols, such as methanol, ethanol, i-propanol and butanol; aliphatic ketones, such as acetone and methyl ethyl ketone; aliphatic carboxylic acid esters, such as ethyl acetate and butyl acetate; aromatic hydrocarbons, such as toluene and xylene; aliphatic hydrocarbons, such as hexane, heptane and cyclohexane; chlorohydrocarbons, such as methylene chloride and dichloroethane; aliphatic nitriles, such as acetonitrile; aliphatic sulphoxides and sulphones, such as dimethylsulphoxide and sulpholane; aliphatic carboxylic acid amides, such as methylacetamide, dimethylacetamide and dimethylformamide; and aliphatic and araliphatic ethers, such as diethyl ether and anisole. Water or a mixture of water with the abovementioned organic solvents can furthermore also be used as a dispersing agent.

Preferred dispersing agents are water or other protic solvents, such as alcohols, e.g. methanol, ethanol, i-propanol and butanol, and mixtures of water with these alcohols; water is the particularly preferred solvent.

The dispersion can moreover comprise further components, such as surface-active substances, e.g. ionic and non-ionic surfactants, or adhesion promoters, such as e.g. organofunctional silanes or hydrolysates thereof, e.g. 3-glycidoxypropyltrialkoxysilane, 3-aminopropyltriethoxysilane, 3-mercaptopropyltrimethoxysilane, 3-methacryloxypropyltrimethoxysilane, vinyltrimethoxysilane or octyltriethoxysilane.

The dispersions according to the invention can comprise further additives which increase the conductivity, such as e.g. compounds comprising ether groups, such as e.g. tetrahydrofuran, compounds comprising lactone groups, such as γ-butyrolactone, γ-valerolactone, compounds comprising amide or lactam groups, such as caprolactam, N-methylcaprolactam, N,N-dimethylacetamide, N-methylacetamide, N,N-dimethylformamide (DMF), N-methylformamide, N-methylformanilide, N-methylpyrrolidone (NMP), N-octylpyrrolidone, pyrrolidone, sulphones and sulphoxides, such as e.g. sulpholane (tetramethylene sulphone), dimethylsulphoxide (DMSO), sugars or sugar derivatives, such as e.g. sucrose, glucose, fructose, lactose, sugar alcohols, such as e.g. sorbitol, mannitol, furan derivatives, such as e.g. 2-furancarboxylic acid, 3-furancarboxylic acid and/or di- or polyalcohols, such as e.g. ethylene glycol, glycerol, di- and triethylene glycol. Tetrahydrofuran, N-methylformamide, N-methylpyrrolidone, ethylene glycol, dimethylsulphoxide or sorbitol are particularly preferably employed as conductivity-increasing additives.

The dispersions according to the invention can moreover comprise one or more organic binders which are soluble in organic solvents or water-soluble, such as polyvinyl acetate, polycarbonate, polyvinylbutyral, polyacrylic acid esters, polyacrylamides, polymethacrylic acid esters, polymethacrylamides, polystyrene, polyacrylonitrile, polyvinyl chloride, polyvinylpyrrolidones, polybutadiene, polyisoprene, polyethers, polyesters, polyurethanes, polyamides, polyimides, polysulphones, silicones, epoxy resins, styrene/acrylic acid ester, vinyl acetate/acrylic acid ester and ethylene/vinyl acetate copolymers, polyvinyl alcohols or celluloses.

The content of the polymeric binder in the dispersion according to the invention is 0.1-90 wt. %, preferably 0.5-30 wt. % and very particularly preferably 0.5-10 wt. %, based on the total weight of the dispersion.

Such an organic binder optionally comprised in the dispersion can also optionally function as the dispersing agent if it is liquid at the given temperature.

The dispersions according to the invention can have a pH of from 1 to 14; a pH of from 1 to 8 is preferred.

Bases or acids, for example, can be added to the dispersions to adjust the pH. Those additions which do not impair the film formation of the dispersions and are not volatile at higher temperatures, e.g. soldering temperatures, such as e.g. the bases 2-(dimethylamino)-ethanol, 2,2'-iminodiethanol or 2,2',2''-nitrilotriethanol and the acid polystyrenesulphonic acid, are preferred.

The viscosity of the dispersion according to the invention can be between 0.1 and 100,000 mPa·s (measured at 20° C. at a shear rate of 100 $s^{-1}$), depending on the method of application. Preferably, the viscosity is 1 to 10,000 mPa·s, particularly preferably between 10 to 1,000 mPa·s.

The preparation of the dispersions according to the invention is carried out by first preparing, from the corresponding precursors for the preparation of conductive polymers, dispersions of electrically conductive polymers in the presence of counter-ions, for example analogously to the conditions mentioned in EP-A440 957. An improved variant for the preparation of these dispersions is the use of ion exchangers for removal of the inorganic salt content or of a part thereof. Such a variant is described, for example, in DE-A196 27 071. The ion exchanger can be stirred with the product, for example, or the product is conveyed over a column filled with an ion exchanger column. Low metal contents, for example, can be achieved by using the ion exchanger.

The particle size of the particles in the dispersion can be reduced after the desalination, for example by means of a high pressure homogenizer. This operation can also be repeated in order to increase the effect. Particularly high pressures of between 100 and 2,000 bar have proved to be particularly advantageous here for greatly reducing the particle size.

Preparation of the Polyaniline/Polyanion, Polypyrrole/Polyanion or Polythiophene/Polyanion complex and subsequent dispersion or redispersion in one or more dispersing agent(s) is also possible.

For preparation of the dispersions according to the invention, the further components, such as, for example, the gallic acid ester, optionally further dispersing agent and optionally further additives, organic binders etc., are then added to these dispersions and the components are mixed, for example while stirring.

Corresponding monomers, for example, are understood as precursors for the preparation of conductive polymers, also called precursors in the following. Mixtures of various precursors can also be used. Suitable monomeric precursors are, for example, optionally substituted thiophenes, pyrroles or anilines, preferably optionally substituted thiophenes, particularly preferably optionally substituted 3,4-alkylenedioxythiophenes.

As substituted 3,4-alkylenedioxythiophenes there may be mentioned by way of example the compounds of the general formula (II)

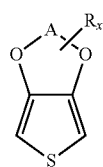

(III)

wherein
A represents an optionally substituted $C_1$-$C_5$-alkylene radical, preferably an optionally substituted $C_2$-$C_3$-alkylene radical,
R independently of each other represents H, a linear or branched, optionally substituted $C_1$-$C_{18}$-alkyl radical, an optionally substituted $C_5$-$C_{12}$-cycloalkyl radical, an optionally substituted $C_1$-$C_{14}$-aryl radical, an optionally substituted $C_7$-$C_{18}$-aralkyl radical, an optionally substituted $C_1$-$C_4$-hydroxyalkyl radical or a hydroxyl radical, preferably a linear or branched, optionally substituted $C_1$-$C_4$-alkyl radical, an optionally substituted $C_1$-$C_4$-hydroxyalkyl radical or a hydroxyl radical, particularly preferably a linear or branched optionally substituted $C_1$-$C_4$-alkyl radical or a hydroxyl radical, x represents an integer from 0 to 8, preferably an integer from 0 to 2, particularly preferably 0 or 1 and
in the case where several radicals R are bonded to A, these can be identical or different.

Very particularly preferred monomeric precursors are optionally substituted 3,4-ethylenedioxythiophenes, in a preferred embodiment unsubstituted 3,4-ethylenedioxythiophene.

Possible substituents for the abovementioned precursors, in particular for the thiophenes, preferably for the 3,4-alkylenedioxythiophenes, are the radicals mentioned for R for the general formula (III).

Possible substituents for pyrroles and anilines are, for example, the radicals A and R listed above and/or the further substituents of the radicals A and R.

Possible optional further substituents of the radicals A and/or the radicals R are the organic groups mentioned in connection with the general formula (I).

Processes for the preparation of the monomeric precursors for the preparation of conductive polymers are known to the person skilled in the art and are described, for example, in L. Grow enendaal, F. Jonas, D. Freitag, H. Pielartzik & J. R. Reynolds, Adv. Mater. 12 (2000) 481-494 and literature cited therein.

The dispersions according to the invention are outstandingly suitable for the production of electrically conductive or antistatic coatings having a heat stability of the electrical properties.

The present invention therefore furthermore provides electrically conductive or antistatic coatings obtainable from the dispersions according to the invention.

For production of the coatings according to the invention, the dispersions according to the invention are applied, for example, by known processes, e.g. by spin coating, impregnation, pouring, dripping on, spraying, misting, knife coating, brushing or printing, for example ink-jet, screen, gravure, offset or tampon printing, to a suitable substrate in a wet film thickness of from 0.5 μm to 250 μm, preferably in a wet film thickness of from 2 μm to 50 μm, and then dried at a temperature of at least from 20° C. to 200° C.

The dispersions according to the invention show a significantly higher stability above room temperature, in particular at temperatures above 80° C., of the electrical properties of the coatings produced therefrom.

The following examples serve to illustrate the invention by way of example and are not to be interpreted as a limitation.

EXAMPLES

Comparison Example 1

Test prints were produced with the commercial screen printing paste Clevios S V3 (manufacturer H.C. Starck GmbH, Goslar) using a screen of polyester fabric with a mesh number of 140/cm. The printed area had the dimensions of 10×2 cm². The prints were dried at 130° C. in a circulating air oven for 15 minutes (min). 2 conductive silver electrodes were then applied in the middle of the film at a distance of 2 cm at right angles to the longitudinal direction and the system was dried at room temperature for 24 hours (h). The conductive silver electrodes were then connected to a multimeter by means of clamps and the surface resistance was measured:
Surface resistance: 400 ohm/square (sq.)

Example 1 According to the Invention 1.0 g of tannin (Aldrich) was dissolved in 200 g of the screen printing paste from the comparison example, while stirring, and test prints were produced as described for the comparison example and the surface resistance was determined.

Surface resistance 450 ohm/sq.

The test prints were then stored in air at 120° C. and the surface resistance was determined after 312 h.

| | Surface resistance [ohm/sq.] | |
|---|---|---|
| | Before storage | After 312 h 120° C. |
| Comparison Example 1 | 400 | 2,600 |
| Example 1 | 450 | 660 |

The stabilizing action of the gallic acid ester additions according to the invention in coatings produced from polythiophene dispersions with the addition of the gallic acid ester additions according to the invention becomes clear from this comparison Comparison Example 2 (According to EP 1798259)

1.0 g of gallic acid propyl ester (Aldrich) was dissolved in 200 g of the screen printing paste from Comparison Example 1, while stirring, and test prints were produced as described for Comparison Example 1 and the surface resistance determined.

Example 2 According to the Invention 1.0 g of tannin (Aldrich) was dissolved in 200 g of the screen printing paste from Comparison Example 1, while stirring, and test prints were produced as described for Comparison Example 2 and the surface resistance determined.

The test prints were then stored in air at 150° C. and the surface resistance was determined after 216 h and the increase in the resistance in % of the starting value was calculated.

| | Increase in the resistance in % (R after storage at 150° C./R after production × 100) |
|---|---|
| Comparison Example 1 | 520 |
| Comparison Example 2 | 350 |
| Example 2 according to the invention | 230 |

The invention claimed is:

1. A dispersion comprising: an electrically conductive polymer, a counter-ion, a dispersing agent, and an ester of gallic acid and a sugar.

2. The dispersion according to claim 1, wherein the electrically conductive polymer comprises a polymer selected from the group consisting of optionally substituted polythiophenes, optionally substituted polyanilines, optionally substituted polypyrroles and mixtures thereof.

3. The dispersion according to claim 1, wherein the electrically conductive polymer comprises a polyalkylenedioxythiophene having repeating units of the general formula (I)

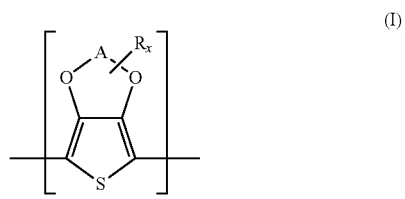

wherein A represents an optionally substituted $C_1$-$C_5$-alkylene radical; each R independently represents a linear or branched, optionally substituted $C_1$-$C_{18}$-alkyl radical, an optionally substituted $C_5$-$C_{12}$-cycloalkyl radical, an optionally substituted $C_6$-$C_{14}$-aryl radical, an optionally substituted $C_7$-$C_{18}$-aralkyl radical, an optionally substituted $C_1$-$C_4$-hydroxyalkyl radical or a hydroxyl radical; and x represents an integer of 0 to 8.

4. The dispersion according to claim 1, wherein the electrically conductive polymer comprises poly(3,4-ethylenedioxythiophene).

5. The dispersion according to claim 1, wherein the counter-ion comprises a monomeric or polymeric anion.

6. The dispersion according to claim 1, wherein the counter-ion comprises a polymeric anion selected from the group consisting of polymeric carboxylic acids and sulphonic acids.

7. The dispersion according to claim 3, wherein the counter-ion comprises a polymeric anion selected from the group consisting of polymeric carboxylic acids and sulphonic acids.

8. The dispersion according to claim 1, wherein the counter-ion comprises polystyrenesulphonic acid.

9. The dispersion according to claim 4, wherein the counter-ion comprises polystyrenesulphonic acid.

10. The dispersion according to claim 1, wherein the ester of gallic acid and a sugar corresponds to the formula

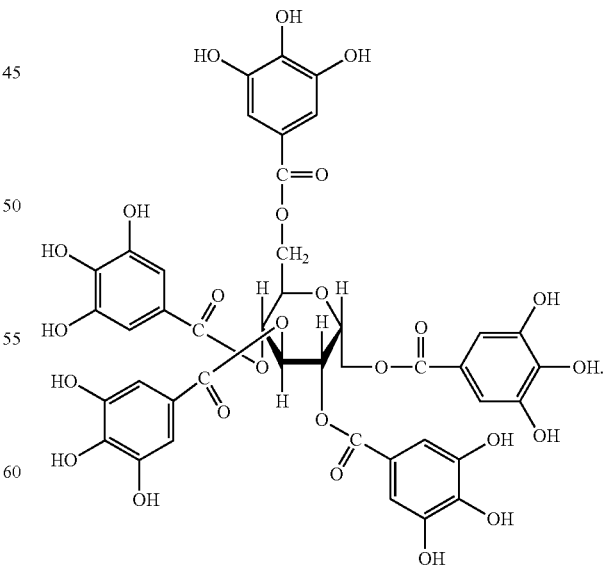

11. The dispersion according to claim 7, wherein the ester of gallic acid and a sugar corresponds to the formula

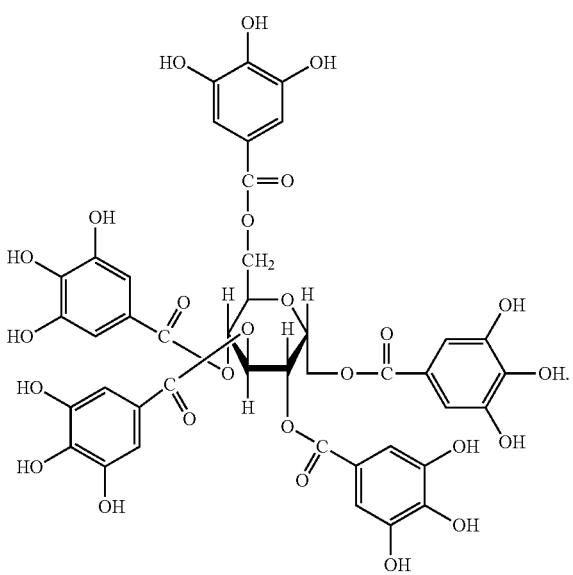

12. The dispersion according to claim 1, wherein the ester of gallic acid and a sugar is present in an amount of 1 to 100 wt. %, based on the solids content of electrically conductive polymer in the dispersion.

13. The dispersion according to claim 1, further comprising a polymeric organic binder.

14. The dispersion according to claim 1, wherein the dispersing agent comprises one or more components selected from the group consisting of water, aliphatic alcohols, aliphatic ketones, aliphatic carboxylic acid esters, aromatic hydrocarbons, aliphatic hydrocarbons, chlorohydrocarbons, aliphatic nitriles, aliphatic sulphoxides and sulphones, aliphatic carboxylic acid amides, aliphatic and araliphatic ethers, and mixtures thereof.

15. A method of preparing an electrically conductive or antistatic coating, the method comprising: (a) providing a dispersion comprising an electrically conductive polymer, a counter-ion, a dispersing agent, and an ester of gallic acid and a sugar; (b) applying the dispersion to a substrate; and (c) drying the applied dispersion.

16. An electrically conductive or antistatic coating comprising a dried dispersion comprising an electrically conductive polymer, a counter-ion, a dispersing agent, and an ester of gallic acid and a sugar.

\* \* \* \* \*